(12) United States Patent
Asano et al.

(10) Patent No.: US 11,459,993 B2
(45) Date of Patent: Oct. 4, 2022

(54) ENGINE APPARATUS

(71) Applicant: TOYOTA JIDOSHA KABUSHIKI KAISHA, Toyota (JP)

(72) Inventors: Yuko Asano, Toyota (JP); Kazuhiko Sakakibara, Toyota (JP); Takeaki Suzuki, Toyota (JP); Masanori Shinohara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/462,417

(22) Filed: Aug. 31, 2021

(65) Prior Publication Data

US 2022/0065211 A1 Mar. 3, 2022

(30) Foreign Application Priority Data

Sep. 3, 2020 (JP) .............................. JP2020-148349

(51) Int. Cl.
| | |
|---|---|
| *F02N 11/00* | (2006.01) |
| *F02N 11/04* | (2006.01) |
| *F02N 11/08* | (2006.01) |
| *F02N 11/10* | (2006.01) |
| *F02N 15/06* | (2006.01) |

(52) U.S. Cl.
CPC ............ *F02N 11/006* (2013.01); *F02N 11/04* (2013.01); *F02N 11/0866* (2013.01); *F02N 11/108* (2013.01); *F02N 15/06* (2013.01); *F02N 2011/0888* (2013.01); *F02N 2200/022* (2013.01); *F02N 2200/046* (2013.01); *F02N 2200/061* (2013.01); *F02N 2200/062* (2013.01); *F02N 2200/063* (2013.01)

(58) Field of Classification Search
CPC .... F02N 11/006; F02N 11/04; F02N 11/0866; F02N 2200/022; F02N 2200/061; F02N 2200/062; F02N 2200/063; F02N 2200/064; F02N 2300/2002
See application file for complete search history.

(56) References Cited

U.S. PATENT DOCUMENTS

| | | | | |
|---|---|---|---|---|
| 6,018,198 | A * | 1/2000 | Tsuzuki | F16D 48/066 290/17 |
| 6,018,199 | A * | 1/2000 | Shiroyama | B60K 6/485 290/37 A |
| 6,396,165 | B1 * | 5/2002 | Nagano | F02N 11/04 307/10.6 |
| 6,418,899 | B1 * | 7/2002 | Bluemel | F02N 11/006 123/179.28 |
| 9,828,924 | B1 * | 11/2017 | Connolly | F02N 11/006 |
| 10,961,970 | B1 * | 3/2021 | Lew | F01N 3/2066 |

(Continued)

FOREIGN PATENT DOCUMENTS

| | | | | |
|---|---|---|---|---|
| JP | 2007246030 | A * | 9/2007 | |
| JP | 2012111267 | A * | 6/2012 | ............ F02N 11/006 |

(Continued)

*Primary Examiner* — John M Zaleskas
(74) *Attorney, Agent, or Firm* — Dinsmore & Shohl LLP

(57) ABSTRACT

In performing double drive startup for starting up an engine while cranking the engine by both a first motor and a second motor, the cranking of the engine by one of the first motor and the second motor is finished earlier than the cranking of the engine by the other of the first motor and the second motor.

3 Claims, 2 Drawing Sheets

(56) References Cited

U.S. PATENT DOCUMENTS

| | | | |
|---|---|---|---|
| 2008/0093863 A1* | 4/2008 | Roh | F02N 11/04 290/38 R |
| 2013/0066492 A1* | 3/2013 | Holmes | B60K 6/485 701/22 |
| 2014/0296025 A1* | 10/2014 | Fushiki | B60W 10/08 477/3 |
| 2014/0324263 A1* | 10/2014 | Tabata | B60K 6/442 701/22 |
| 2014/0371961 A1* | 12/2014 | Kim | B60W 20/13 701/22 |
| 2015/0096518 A1* | 4/2015 | Creviston | F02N 11/0844 123/179.4 |
| 2017/0204828 A1* | 7/2017 | Imura | F02N 11/0844 |
| 2017/0254310 A1* | 9/2017 | Nakaoka | F02N 11/101 |
| 2018/0056972 A1* | 3/2018 | Kim | B60W 30/194 |
| 2018/0163686 A1* | 6/2018 | Kim | F02N 11/08 |
| 2018/0340503 A1* | 11/2018 | Kim | F02N 11/006 |
| 2019/0145368 A1* | 5/2019 | Nakaoka | F02N 15/04 123/179.3 |
| 2019/0153987 A1* | 5/2019 | Connolly | B60W 10/02 |
| 2019/0390640 A1* | 12/2019 | Ishida | F02N 11/0851 |
| 2020/0130695 A1* | 4/2020 | Ando | F02N 11/006 |
| 2020/0189561 A1* | 6/2020 | Mao | B60W 20/50 |
| 2020/0200137 A1* | 6/2020 | Kaneda | F02N 11/00 |
| 2021/0171008 A1* | 6/2021 | Jang | B60W 10/30 |

FOREIGN PATENT DOCUMENTS

| | | | | |
|---|---|---|---|---|
| JP | 2013193551 A | * | 9/2013 | |
| JP | 2014101847 A | * | 6/2014 | |
| JP | 2014-189032 A | | 10/2014 | |
| JP | 2015209100 A | * | 11/2015 | |
| JP | 2016107650 A | * | 6/2016 | |
| JP | 2017002819 A | * | 1/2017 | |
| JP | 2017089385 A | * | 5/2017 | F02N 11/006 |
| JP | 2017217943 A | * | 12/2017 | |

\* cited by examiner

ENGINE APPARATUS

CROSS-REFERENCE TO RELATED APPLICATION

This application claims priority to Japanese Patent Application No. 2020-148349 filed on Sep. 3, 2020, incorporated herein by reference in its entirety.

BACKGROUND

1. Technical Field

The disclosure relates to an engine apparatus.

2. Description of Related Art

Conventionally, as this kind of engine apparatus, there is proposed an engine apparatus that is equipped with an engine, a starter capable of cranking the engine, an auxiliary battery capable of supplying electric power to the starter, an electric motor capable of cranking the engine, and a main battery capable of supplying electric power to the electric motor (e.g., see Japanese Unexamined Patent Application Publication No. 2014-189032 (JP 2014-189032 A)). In this engine apparatus, in starting up the engine while cranking the engine by both the starter and the electric motor, the cranking of the engine by both the starter and the electric motor is finished when the rotational speed of the engine becomes equal to or higher than a predetermined value at which complete explosion is possible (autonomous rotation is possible) through fuel injection and ignition.

SUMMARY

In the foregoing engine apparatus, the starter and the electric motor are supplied with electric power from the auxiliary battery and the main battery respectively until the engine becomes capable of complete explosion, so the time of supply of electric power from the respective batteries (the discharge time of the respective batteries) becomes long, and the deterioration in the batteries may progress.

It is a main object of an engine apparatus of the disclosure, which is equipped with a first electrical storage device capable of supplying electric power to a first motor capable of cranking an engine, and a second electrical storage device capable of supplying electric power to a second motor capable of cranking the engine, to restrain a deterioration in the first electrical storage device or a deterioration in the second electrical storage device from progressing.

In order to achieve the foregoing main object, the engine apparatus of the disclosure has adopted the following features.

An engine apparatus of the disclosure is equipped with an engine, a first motor capable of cranking the engine, a first electrical storage device capable of supplying electric power to the first motor, a second motor capable of cranking the engine, a second electrical storage device capable of supplying electric power to the second motor, and a control device that controls the engine, the first motor, and the second motor. The control device finishes cranking the engine by one of the first motor and the second motor earlier than cranking the engine by the other of the first motor and the second motor, in performing double drive startup for starting up the engine while cranking the engine by both the first motor and the second motor.

In the engine apparatus of the disclosure, when double drive startup for starting up the engine while cranking the engine by both the first motor and the second motor is performed, the cranking of the engine by one of the first motor and the second motor is finished earlier than the cranking of the engine by the other of the first motor and the second motor. Thus, in the case where the cranking of the engine by the first motor is finished earlier than the cranking of the engine by the second motor, the time of supply of electric power from the first electrical storage device can be restrained from becoming long, so the deterioration in the first electrical storage device can be restrained from progressing. Besides, in the case where the cranking of the engine by the second motor is finished earlier than the cranking of the engine by the first motor, the time of supply of electric power from the second electrical storage device can be restrained from becoming long, so the deterioration in the second electrical storage device can be restrained from progressing.

In the engine apparatus of the disclosure, the control device may finish cranking the engine by the second motor earlier than cranking the engine by the first motor when a degree of deterioration in the second electrical storage device is equal to or higher than a predetermined degree in performing the double drive startup. In this manner, when the degree of deterioration in the second electrical storage device is equal to or higher than the predetermined degree, the deterioration in the second electrical storage device can be restrained from progressing.

In this case, the control device may finish cranking the engine by the second motor before a rotational speed of the engine becomes equal to or higher than a predetermined rotational speed and the engine undergoes complete explosion (becomes capable of rotating autonomously), and then finish cranking the engine by the first motor after the engine undergoes complete explosion, when the degree of deterioration in the second electrical storage device is equal to or higher than the predetermined degree in performing the double drive startup.

In the engine apparatus of the disclosure, the first motor may be a starter, the second motor may be a motor-generator capable of cranking the engine and generating electric power through the use of motive power from the engine, the second electrical storage device may be capable of exchanging electric power with the motor-generator, and the control device may finish cranking the engine by the motor-generator earlier than cranking the engine by the starter, in performing the double drive startup. In this manner, the deterioration in the second electrical storage device that exchanges electric power with the motor-generator can be restrained from progressing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the disclosure will be described using one of the embodiments.

Figure 1:
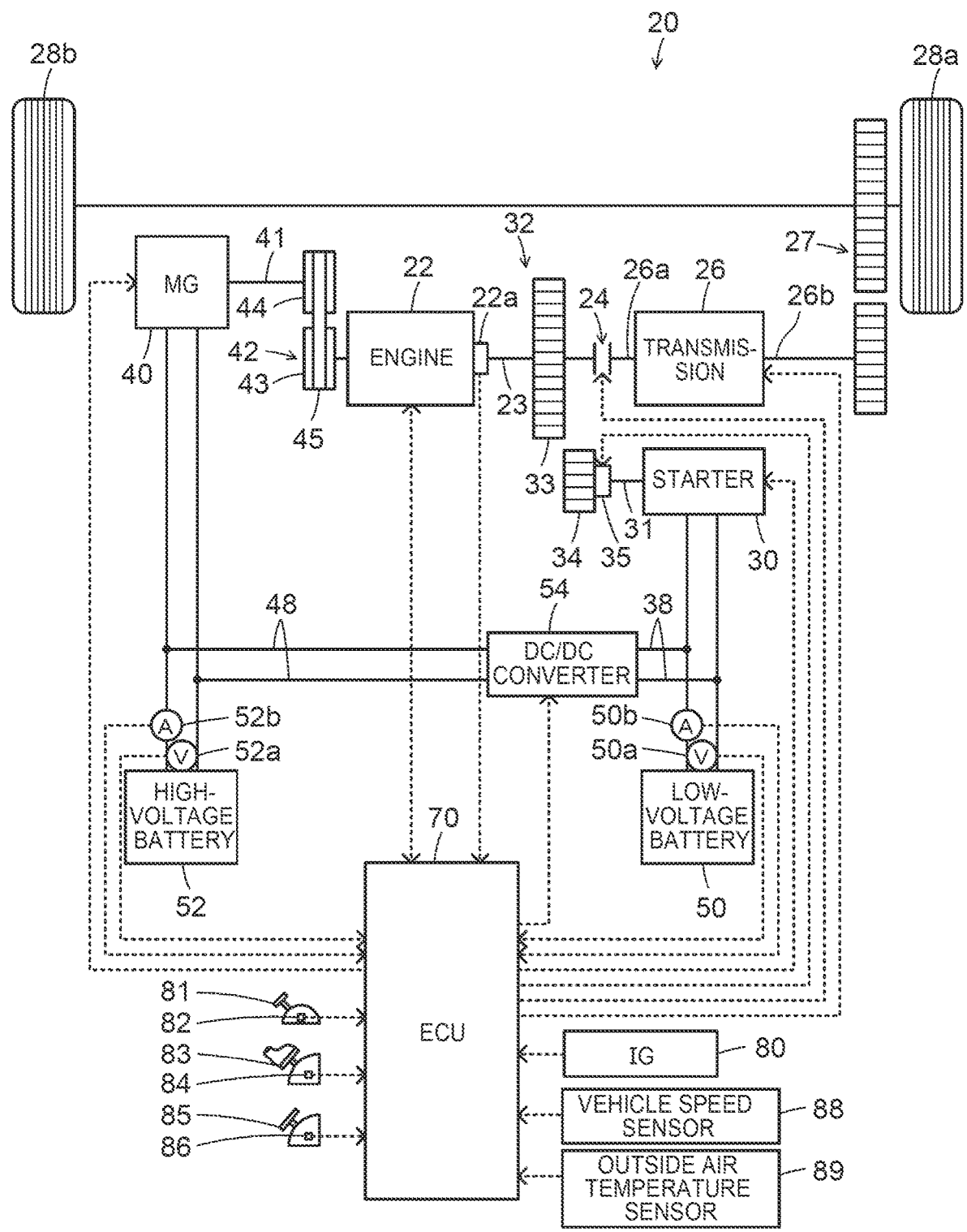
FIG. 1 is a configuration view showing the outline of the configuration of a hybrid automobile 20 that is mounted with an engine apparatus as one of the embodiments of the disclosure.

FIG. 1 is a configuration view showing the outline of the configuration of a hybrid automobile 20 that is mounted with an engine apparatus as one of the embodiments of the disclosure. As shown in FIG. 1, the hybrid automobile 20 of the embodiment is equipped with an engine 22, a clutch 24, a transmission 26, a starter 30 as a first motor, a gear mechanism 32, a motor-generator 40 as a second motor, a belt mechanism 42, a low-voltage battery 50 as a first electrical storage device, a high-voltage battery 52 as a second electrical storage device, a DC/DC converter 54, and an electronic control unit (hereinafter referred to as "an ECU") 70 as a control device. In the embodiment, "the engine apparatus" of the disclosure is equivalent to the engine 22, the starter 30, the motor-generator 40, the low-voltage battery 50, the high-voltage battery 52, and the ECU 70.

The engine 22 is configured as an internal combustion engine that outputs motive power using gasoline, light oil, or the like as fuel. The clutch 24 is configured as, for example, a hydraulically driven friction clutch, and connects/disconnects a crankshaft 23 of the engine 22 and an input shaft 26a of the transmission 26 to/from each other. The transmission 26 is configured as, for example, a 10-speed automatic transmission, and has the input shaft 26a, an output shaft 26b, a plurality of planetary gears, and a plurality of hydraulically driven frictional engagement elements (clutches and brakes). The input shaft 26a is coupled to the crankshaft 23 of the engine 22 via the clutch 24, and the output shaft 26b is coupled to driving wheels 28a and 28b via a gear mechanism 27. The transmission 26 transmits motive power between the input shaft 26a and the output shaft 26b through the formation of forward stages of first to tenth speeds and a backward stage, by engaging and disengaging the frictional engagement elements. Incidentally, the transmission 26 may not necessarily be a 10-speed transmission. A four-speed transmission, a five-speed transmission, a six-speed transmission, an eight-speed transmission, or the like may be used as the transmission 26.

The starter 30 is connected to an electric power line 38. The gear mechanism 32 has a ring gear 33 that has outer teeth and that is attached to the crankshaft 23 of the engine 22, a pinion gear 34 that rotates integrally with a rotary shaft 31 of the starter 30, and an actuator 35 that ensures or cancels the meshing of the pinion gear 34 and the ring gear 33 by moving the pinion gear 34 in an axial direction thereof.

The motor-generator 40 is connected to an electric power line 48. The belt mechanism 42 has a pulley 43 attached to the crankshaft 23 of the engine 22, a pulley 44 attached to a rotary shaft 41 of the motor-generator 40, and a belt 45 hung around the pulley 43 and the pulley 44.

The low-voltage battery 50 is configured as, for example, a lithium-ion secondary battery, a nickel hydride battery, a lead storage battery with a rated voltage of 12 V, and is connected to the electric power line 38. The high-voltage battery 52 is configured as, for example, a lithium-ion secondary battery or a nickel hydride battery with a rated voltage of about 40 V to 50 V, and is connected to the electric power line 48. The DC/DC converter 54 is connected to the electric power line 38 and the electric power line 48, raises the voltage of the electric power of the electric power line 38 to supply the electric power line 48 therewith, and lowers the voltage of the electric power of the electric power line 48 to supply the electric power line 38 therewith.

The ECU 70 is configured as a microprocessor that is mainly constituted of a CPU, and is equipped with a ROM that stores a processing program, a RAM that temporarily stores data, a flash memory that stores and retains data, and input/output ports, as well as the CPU. Signals from various sensors are input to the ECU 70 via the input ports respectively. As the signals that are input to the ECU 70, it is possible to mention, for example, a crank angle θcr that is a rotational position of the crankshaft 23 of the engine 22 from a crank position sensor 22a. Besides, it is also possible to mention voltages VBL and VBH of the low-voltage battery 50 and the high-voltage battery 52 from voltage sensors 50a and 52a attached between terminals of the low-voltage battery 50 and the high-voltage battery 52 respectively, and currents IBL and IBH of the low-voltage battery 50 and the high-voltage battery 52 from current sensors 50b and 52b attached to output terminals of the low-voltage battery 50 and the high-voltage battery 52 respectively. It is also possible to mention an ignition signal from an ignition switch 80, and a shift position SP from a shift position sensor 82 that detects an operation position of a shift lever 81. It is also possible to mention an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88. It is also possible to mention an outside air temperature Tout from an outside air temperature sensor 89.

Various control signals are output from the ECU 70 via the output ports respectively. As the signals that are output from the ECU 70, it is possible to mention, for example, control signals to the engine 22, the clutch 24, the transmission 26, the starter 30, the actuator 35, the motor-generator 40, and the DC/DC converter 54.

The ECU 70 computes a rotational speed Ne of the engine 22 based on the crank angle θcr of the engine 22 from the crank position sensor 22a. Besides, the ECU 70 computes internal resistances RBL and RBH of the low-voltage battery 50 and the high-voltage battery 52 based on a plurality of sets (a plurality of sample data) of voltages VBL and VBH of the low-voltage battery 50 and the high-voltage battery 52 from the voltage sensors 50a and 52a respectively and currents IBL and IBH of the low-voltage battery 50 and the high-voltage battery 52 from the current sensors 50b and 52b respectively. Furthermore, the ECU 70 computes electrical storage rates SOCL and SOCH of the low-voltage battery 50 and the high-voltage battery 52 based on integrated values of the currents IBL and IBH of the low-voltage battery 50 and the high-voltage battery 52 respectively.

In the hybrid automobile 20 of the embodiment thus configured, the ECU 70 sets a target shift speed Gr* of the transmission 26 based on the accelerator depression amount Acc and the vehicle speed V (a rotational speed Nout of the output shaft 26b of the transmission 26), and controls the transmission 26 such that a shift speed Gr of the transmission 26 becomes the target shift speed Gr*. Besides, the ECU 70 sets a required torque Tin* required of the input shaft 26a of the transmission 26 based on the accelerator depression amount Acc, the vehicle speed V, and the shift speed Gr of the transmission 26, sets a target torque Te* of the engine 22 such that the required torque Tin* is output to the input shaft 26a of the transmission 26, and controls the engine 22. In controlling the engine 22, intake air amount control for controlling an intake air amount, fuel injection control for controlling a fuel injection amount, ignition control for controlling an ignition timing, and the like are performed. Incidentally, when the electrical storage rate SOCH of the high-voltage battery 52 falls, electric power is generated by the motor-generator 40 through the use of the power from the engine 22, as needed, and the high-voltage battery 52 is charged.

Figure 2:
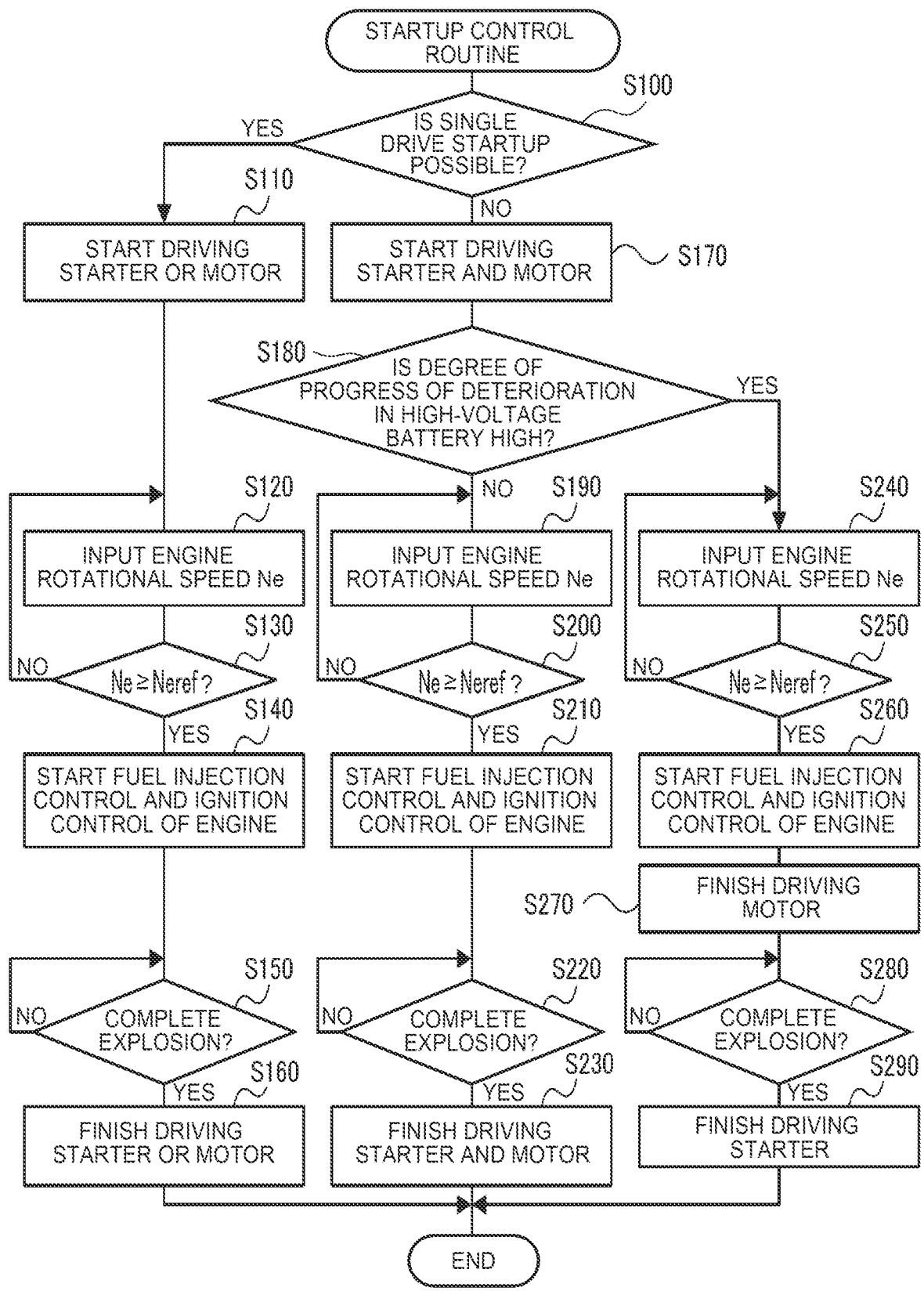
FIG. 2 is a flowchart showing an example of a startup control routine that is executed by an ECU 70.

Next, the operation of the hybrid automobile 20 of the embodiment thus configured, especially the operation in starting up the engine 22 will be described. FIG. 2 is a flowchart showing an example of a startup control routine that is executed by the ECU 70. This routine is executed when the startup of the engine 22 is requested.

When the startup control routine of FIG. 2 is executed, the ECU 70 first determines whether or not single drive startup for starting up the engine 22 while cranking the engine 22 by one of the starter 30 and the motor-generator 40 is possible (step S100). This determination is made by, for example, comparing the outside air temperature Tout with a threshold Toutref (e.g., about −20° C. to −30° C.). This is because the viscosity of engine oil increases and the friction of the engine 22 increases as the outside air temperature Tout lowers.

If it is determined in step S100 that single drive startup is possible, the ECU 70 starts cranking the engine 22 by one of the starter 30 and the motor-generator 40 (step S110). It should be noted herein that the motor used to crank the engine 22 is selected from the starter 30 and the motor-generator 40 as follows. In the embodiment, the motor-generator 40 is selected preferentially, in view of the fact that the rated voltage of the high-voltage battery 52 is higher than the rated voltage of the low-voltage battery 50, namely, that the voltage applied to the motor-generator 40 is higher than the voltage applied to the starter 30. It should be noted, however, that the starter 30 may be selected to restrain the deterioration in the high-voltage battery 52 from progressing when the degree of deterioration in the high-voltage battery 52 is high to a certain extent (equal to or higher than a predetermined degree that will be described later). Besides, the method of selecting the motor for the engine 22 is not limited in this manner, but the starter 30 may be selected preferentially. For example, in the case where the starter 30 is configured as a DC series motor and the motor-generator 40 is configured as a DC shunt motor-generator, it is conceivable to preferentially select the starter 30 because the DC series motor generally has the property of being able to output a larger torque than the DC shunt motor-generator when being stopped from rotating. Incidentally, in the case where the engine 22 is cranked by the starter 30, the actuator 35 is driven to mesh the pinion gear 34 with the ring gear 33, and then the cranking of the engine 22 by the starter 30 is started.

Subsequently, the ECU 70 receives the rotational speed Ne of the engine 22 (step S120), waits until the rotational speed Ne of the engine 22 becomes equal to or higher than a threshold Neref (step S130), and starts fuel injection control and ignition control of the engine 22 (step S140). It should be noted herein that a value computed based on the crank angle θcr of the engine 22 from the crank position sensor 22a is input to the ECU 70 as the rotational speed Ne of the engine 22. The threshold Neref used is, for example, about several hundreds of rpm. When fuel injection control and ignition control of the engine 22 are thus started, the ECU 70 waits until the engine 22 undergoes complete explosion (becomes capable of autonomously rotating) (step S150), finishes cranking the engine 22 by the aforementioned one of the starter 30 and the motor-generator 40 (step S160), and ends the present routine.

If it is determined in step S100 that single drive startup is not possible, the ECU 70 starts cranking the engine 22 by both the starter 30 and the motor-generator 40 (step S170).

Subsequently, the ECU 70 determines whether or not the degree of deterioration in the high-voltage battery 52 is equal to or higher than the predetermined degree (step S180). This determination is made by, for example, comparing the internal resistance RBH of the high-voltage battery 52 with a threshold RBHref. This is because the internal resistance RBH of the high-voltage battery 52 increases as the degree of deterioration in the high-voltage battery 52 increases (as the deterioration in the high-voltage battery 52 progresses).

If it is determined in step S180 that the degree of deterioration in the high-voltage battery 52 is lower than the predetermined degree, the ECU 70 receives the rotational speed Ne of the engine 22 (step S190), waits until the rotational speed Ne of the engine 22 becomes equal to or higher than the threshold Neref (step S200), and starts fuel injection control and ignition control of the engine 22 (step S210). Then, the ECU 70 waits until the engine 22 undergoes complete explosion (step S220), finishes cranking the engine 22 by both the starter 30 and the motor-generator 40 (step S230), and ends the present routine. Thus, the engine 22 can be swiftly started up (in a short time) when single drive startup is not possible.

If it is determined in step S180 that the degree of deterioration in the high-voltage battery 52 is equal to or higher than the predetermined degree, the ECU 70 receives the rotational speed Ne of the engine 22 (step S240), waits until the rotational speed Ne of the engine 22 becomes equal to or higher than the threshold Neref (step S250), starts fuel injection control and ignition control of the engine 22 (step S260), and finishes cranking the engine 22 by the motor-generator 40 (step S270). Then, the ECU 70 waits until the engine 22 undergoes complete explosion (step S280), finishes cranking the engine 22 by the starter 30 (step S290), and ends the present routine. Thus, the time for cranking the engine 22 by the motor-generator 40 is shorter than when the engine 22 is cranked by both the starter 30 and the motor-generator 40 until the engine 22 undergoes complete explosion in the case where single drive startup is not possible. Therefore, the time of supply of electric power from the high-voltage battery 52 (the discharge time of the high-voltage battery 52) can be shortened, and the deterioration in the high-voltage battery 52 can be restrained from progressing. As a result, the life of the high-voltage battery 52 can be restrained from becoming short.

In the engine apparatus that is mounted in the hybrid automobile 20 of the embodiment described above, when the degree of deterioration in the high-voltage battery 52 is equal to or higher than the predetermined degree in performing double drive startup for starting up the engine 22 while cranking the engine 22 by both the starter 30 and the motor-generator 40, the cranking of the engine 22 by the motor-generator 40 is finished before the rotational speed Ne of the engine 22 becomes equal to or higher than the threshold Neref and the engine 22 undergoes complete explosion, and then the cranking of the engine 22 by the starter 30 is finished after the engine 22 undergoes complete explosion. That is, the cranking of the engine 22 by the motor-generator 40 is finished earlier than the cranking of the engine 22 by the starter 30. Thus, the time of supply of electric power from the high-voltage battery 52 (the discharge time of the high-voltage battery 52) can be made shorter, and the deterioration in the high-voltage battery 52 can be further restrained from progressing than in the case where the cranking of the engine 22 by both the starter 30 and the motor-generator 40 is finished after the engine 22 undergoes complete explosion. As a result, the life of the high-voltage battery 52 can be restrained from becoming short.

In the engine apparatus that is mounted in the hybrid automobile 20 of the embodiment, in performing double drive startup, the cranking of the engine 22 by the starter 30 and the cranking of the engine 22 by the motor-generator 40 are substantially simultaneously finished when the degree of deterioration in the high-voltage battery 52 is lower than the predetermined degree, and the cranking of the engine 22 by the motor-generator 40 is finished earlier than the cranking of the engine 22 by the starter 30 when the degree of deterioration in the high-voltage battery 52 is equal to or higher than the predetermined degree. However, in performing double drive startup, the cranking of the engine 22 by the motor-generator 40 may be finished earlier than the cranking of the engine 22 by the starter 30 regardless of the degree of deterioration in the high-voltage battery 52. In this manner, the deterioration in the high-voltage battery 52 can be restrained from progressing, and the life of the high-voltage battery 52 can be restrained from becoming short. Besides, in performing double drive startup, the cranking of the engine 22 by the starter 30 may be finished earlier than the cranking of the engine 22 by the motor-generator 40, regardless of the degree of deterioration in the low-voltage battery 50. In this manner, the deterioration in the low-voltage battery 50 can be restrained from progressing, and the life of the low-voltage battery 50 can be restrained from becoming short.

In the engine apparatus that is mounted in the hybrid automobile 20 according to the embodiment, in performing double drive startup, the cranking of the engine 22 by the starter 30 and the cranking of the engine 22 by the motor-generator 40 are substantially simultaneously finished when the degree of deterioration in the high-voltage battery 52 is lower than the predetermined degree, and the cranking of the engine 22 by the motor-generator 40 is finished earlier than the cranking of the engine 22 by the starter 30 when the degree of deterioration in the high-voltage battery 52 is equal to or higher than the predetermined degree. However, in performing double drive startup, the cranking of the engine 22 by the starter 30 may be finished earlier than the cranking of the engine 22 by the motor-generator 40 when the degree of deterioration in the high-voltage battery 52 is lower than the predetermined degree and the degree of deterioration in the low-voltage battery 50 is equal to or higher than a second predetermined degree. For example, the cranking of the engine 22 by the starter 30 may be finished before the rotational speed Ne of the engine 22 becomes equal to or higher than the threshold Neref and the engine 22 undergoes complete explosion, and the cranking of the engine 22 by the motor-generator 40 may be finished after the engine 22 undergoes complete explosion. In this manner, the degree of deterioration in the low-voltage battery 50 can be restrained from progressing, and the life of the low-voltage battery 50 can be restrained from becoming short. Incidentally, it is determined whether or not the degree of deterioration in the low-voltage battery 50 is equal to or higher than the second predetermined degree, for example, by comparing the internal resistance RBL of the low-voltage battery 50 with the threshold RBLref. This is because the internal resistance RBL of the low-voltage battery 50 increases as the deterioration in the low-voltage battery 50 progresses.

In the engine apparatus that is mounted in the hybrid automobile 20 according to the embodiment, single drive startup is performed when single drive startup is possible, and double drive startup is performed when single drive startup is not possible. However, double drive startup may be performed regardless of whether or not single drive startup is possible.

In the engine apparatus that is mounted in the hybrid automobile 20 according to the embodiment, the low-voltage battery 50 is used as the first electrical storage device. However, a capacitor may be used instead of the low-voltage battery 50. Besides, in the embodiment, the high-voltage battery 52 is used as the second electrical storage device. However, a capacitor may be used instead of the high-voltage battery 52.

In the engine apparatus that is mounted in the hybrid automobile 20 according to the embodiment, the engine 22 and the motor-generator 40 are connected to each other via the belt mechanism 42. However, the engine 22 and the motor-generator 40 may be connected to each other via a gear mechanism.

The engine apparatus that is mounted in the hybrid automobile 20 according to the embodiment is equipped with the engine 22, the starter 30 connected to the engine 22 via the gear mechanism 32, the low-voltage battery 50 connected to the starter 30 via the electric power line 38, the motor-generator 40 connected to the engine 22 via the belt mechanism 42, and the high-voltage battery 52 connected to the motor-generator 40 via the electric power line 48. However, the engine apparatus is not limited to this configuration. As long as the engine apparatus is equipped with an engine, a first motor capable of cranking the engine, a first electrical storage device capable of supplying electric power to the first motor, a second motor capable of cranking the engine, and a second electrical storage device capable of supplying electric power to the second motor, any configuration may be adopted.

In the embodiment, the engine apparatus is designed to be mounted in the hybrid automobile 20. However, the engine apparatus may be designed to be mounted in a vehicle other than an automobile, or may be designed to be installed in a non-mobile facility such as a construction facility.

A corresponding relationship between the main elements of the embodiment and the main elements of the disclosure mentioned in the section for solving the problem will be described. In the embodiment, the engine 22 is equivalent to "the engine", the starter 30 is equivalent to "the first motor", the low-voltage battery 50 is equivalent to "the first electrical storage device", the motor-generator 40 is equivalent to "the second motor", the high-voltage battery 52 is equivalent to "the second electrical storage device", and the ECU 70 is equivalent to "the control device".

Incidentally, the corresponding relationship between the main elements of the embodiment and the main elements of the disclosure mentioned in the section for solving the problem is an example for concretely illustrating the mode for carrying out the disclosure mentioned in the section for solving the problem by the embodiment, and hence does not limit the elements of the disclosure mentioned in the section for solving the problem. That is, the disclosure mentioned in the section for solving the problem should be construed based on what is described in the section, and the embodiment is nothing more than a concrete example of the disclosure mentioned in the section for solving the problem.

While the mode for carrying out the disclosure has been described above using the embodiment, it is obvious that the disclosure is not limited at all to the embodiment, but can be carried out in various modes within such a range as not to depart from the gist of the disclosure.

The disclosure can be utilized in industries for manufacturing engine apparatuses, and the like.

What is claimed is:

1. An engine apparatus comprising:
   an engine;
   a first motor capable of cranking the engine;
   a first electrical storage device capable of supplying electric power to the first motor;
   a second motor capable of cranking the engine;
   a second electrical storage device capable of supplying electric power to the second motor; and
   an electronic control unit that controls the engine, the first motor, and the second motor, wherein:
   the electronic control unit finishes cranking the engine by one of the first motor and the second motor earlier than cranking the engine by the other of the first motor and the second motor, in performing double drive startup for starting up the engine while cranking the engine by initially starting both the first motor and the second motor,
   the first motor is a starter,
   the second motor is a motor-generator capable of cranking the engine and generating electric power through use of motive power from the engine,
   the second electrical storage device is capable of exchanging electric power with the motor-generator, and
   the electronic control unit finishes cranking the engine by the motor-generator earlier than cranking the engine by the starter, in performing the double drive startup.

2. The engine apparatus according to claim 1, wherein the electronic control unit finishes cranking the engine by the second motor earlier than cranking the engine by the first motor when a degree of deterioration in the second electrical storage device is equal to or higher than a predetermined degree in performing the double drive startup.

3. The engine apparatus according to claim 2, wherein the electronic control unit finishes cranking the engine by the second motor before a rotational speed of the engine becomes equal to or higher than a predetermined rotational speed and the engine undergoes complete explosion, and then finishes cranking the engine by the first motor after the engine undergoes complete explosion, when the degree of deterioration in the second electrical storage device is equal to or higher than the predetermined degree in performing the double drive startup.

* * * * *